(12) United States Patent
Chou et al.

(10) Patent No.: US 12,469,999 B2
(45) Date of Patent: Nov. 11, 2025

(54) LIQUID-COOLED CHARGING CONNECTOR

(71) Applicant: Tesla, Inc., Palo Alto, CA (US)

(72) Inventors: Chuen Chou, Half Moon Bay, CA (US); Pascal-Andre Fortin, Palo Alto, CA (US)

(73) Assignee: Tesla, Inc., Austin, TX (US)

( * ) Notice: Subject to any disclaimer, the term of this patent is extended or adjusted under 35 U.S.C. 154(b) by 1045 days.

(21) Appl. No.: 17/305,554

(22) Filed: Jul. 9, 2021

(65) Prior Publication Data

US 2022/0037821 A1 Feb. 3, 2022

Related U.S. Application Data

(63) Continuation of application No. 15/928,307, filed on Mar. 22, 2018, now Pat. No. 11,084,390.

(51) Int. Cl.

| H02J 7/00 | (2006.01) |
| B60L 53/16 | (2019.01) |
| B60L 53/18 | (2019.01) |
| B60L 53/302 | (2019.01) |
| H01R 13/00 | (2006.01) |
| H01R 13/405 | (2006.01) |

(Continued)

(52) U.S. Cl.
CPC ............ *H01R 13/005* (2013.01); *B60L 53/16* (2019.02); *B60L 53/18* (2019.02); *B60L 53/302* (2019.02); *H01R 13/405* (2013.01); *H01R 13/5202* (2013.01); *H01R 13/665* (2013.01); *H02J 7/0042* (2013.01); *B60Y 2306/05* (2013.01); *H01R 2201/26* (2013.01)

(58) Field of Classification Search
USPC .................. 320/106, 107, 108, 109, 110, 112
See application file for complete search history.

(56) References Cited

U.S. PATENT DOCUMENTS

| 5,647,450 A | 7/1997 | Ogawa et al. |
| 5,670,860 A | 9/1997 | Conrady et al. |
| 5,909,099 A | 6/1999 | Watanabe et al. |

(Continued)

FOREIGN PATENT DOCUMENTS

| CN | 106347166 | 1/2017 |
| CN | 107425323 | 12/2017 |

(Continued)

OTHER PUBLICATIONS

International Search Report and Written Opinion; International Application No. PCT/IB2019/052239; Jun. 28, 2019; 10 pp.

*Primary Examiner* — Brian Ngo
(74) *Attorney, Agent, or Firm* — Knobbe, Martens, Olson & Bear, LLP (57) ABSTRACT

A charging connector includes a first electrical socket and a second electrical socket. A first sleeve and a second sleeve are provided, such that the first sleeve is concentrically coupled to the first electrical socket and the second sleeve is concentrically coupled to the second electrical socket. A manifold assembly is adapted to enclose the first and second electrical sockets and the first and second sleeves, such that the first and second sleeves and the manifold assembly create a hollow interior space there between. An inlet conduit and an outlet conduit within the manifold assembly such that inlet conduit, the interior space, and the outlet conduit together create a fluid flow path.

20 Claims, 10 Drawing Sheets

(51) Int. Cl.
    *H01R 13/52*    (2006.01)
    *H01R 13/66*    (2006.01)

(56)     References Cited

U.S. PATENT DOCUMENTS

| | | | |
|---|---|---|---|
| 11,084,390 | B2 | 8/2021 | Chou et al. |
| 2011/0269008 | A1 | 11/2011 | Houchin-Miller et al. |
| 2013/0056419 | A1* | 3/2013 | Curtis ................. A61M 1/1656 |
| | | | 210/90 |
| 2013/0267115 | A1 | 10/2013 | Mark |
| 2014/0247018 | A1 | 9/2014 | Kikuchi et al. |
| 2015/0054460 | A1 | 2/2015 | Epstein et al. |
| 2015/0217654 | A1 | 8/2015 | Woo et al. |
| 2016/0144737 | A1 | 5/2016 | Liu |
| 2016/0221458 | A1 | 8/2016 | Lopez |
| 2017/0144558 | A1 | 5/2017 | Remisch |
| 2017/0338006 | A1 | 11/2017 | Gontarz et al. |
| 2018/0075946 | A1 | 3/2018 | Beimdieck et al. |
| 2019/0036254 | A1* | 1/2019 | Moseke ............... H01R 13/533 |
| 2019/0126764 | A1* | 5/2019 | Führer .................... B60L 53/16 |
| 2019/0252095 | A1* | 8/2019 | Mayer ...................... B60L 53/302 |
| 2020/0303093 | A1* | 9/2020 | Cantz ........................ H01R 9/11 |

FOREIGN PATENT DOCUMENTS

| | | |
|---|---|---|
| DE | 10 2016 209607 | 12/2017 |
| WO | WO 17/133893 | 8/2017 |
| WO | WO 17/162532 | 9/2017 |
| WO | WO 17/162651 | 9/2017 |

* cited by examiner

LIQUID-COOLED CHARGING CONNECTOR

CROSS-REFERENCE TO RELATED APPLICATION

This application is a continuation of, and claims priority to, U.S. patent application Ser. No. 15/928,307 titled "LIQUID-COOLED CHARGING CONNECTOR" and filed on Mar. 22, 2018, the disclosure of which is hereby incorporated herein by reference in its entirety.

TECHNICAL FIELD

The present disclosure generally relates to a charging connector for an electric vehicle, and more particularly to a liquid-cooled charging connector for an electric vehicle.

BACKGROUND

Electric vehicles and hybrids generally use electric power from a rechargeable battery as a power source. These rechargeable batteries must be recharged from another energy source. Recharging can occur at a charging stating by connecting an energy supply to a vehicle's charging inlet through a cable with attached charging connector. To transfer energy faster and decrease charging times, the cable and charging connector must be capable of withstanding high current loads. Current charging connectors are limited in the current loads that they can support as their ability to dissipate heat is limited. Thus, there is a need for a new charging connector to solve the aforementioned problems.

SUMMARY

The present disclosure related to a new charging connector. The charging connector has a first electrical socket and a second electrical socket. A first sleeve is concentrically coupled to the first electrical socket and a second sleeve is concentrically coupled to the second electrical socket. A manifold assembly encloses the first and second electrical sockets and the first and second sleeves, such that the first and second sleeves and manifold assembly create a hollow interior space there between. The manifold assembly has an inlet conduit and an outlet conduit such that inlet conduit, interior space, and outlet conduit together create a fluid flow path. Cooling fluid flows through the fluid flow path and cools the charging connector. During operation, the cooling fluid bifurcates into a first fluid stream which flows around first sleeve, and a second fluid stream which flows around second sleeve. The first and second fluid streams combine upstream of the outlet conduit. The first sleeve encloses first electrical socket, and the second sleeve encloses second electrical socket. The cooling sleeves are made from a thermally conducting material such that heat generated by electrical sockets can be removed by the cooling fluid. In embodiments, this thermally conducting material is a thermally conductive plastic material.

In some embodiments of the present disclosure, a charging system for an electric vehicle is provided. The charging system includes a power supply for supplying electric power to charge a power source of the electric vehicle. The charging system further includes a charging cable having a first end and a second end, such that first end of charging cable is connected to the power supply and a charging cable is connected to the second end. The charging connector has a form factor that allows for the connecting of the charging connector to a charging inlet of electric vehicle. The charging connector has a first electrical socket and a second electrical socket. A first sleeve is concentrically coupled to the first electrical socket and a second sleeve is concentrically coupled to the second electrical socket. A manifold assembly encloses the first and second electrical sockets and the first and second sleeves, such that the first and second sleeves and manifold assembly create a hollow interior space there between. The manifold assembly has an inlet conduit and an outlet conduit such that inlet conduit, interior space, and outlet conduit together create a fluid flow path. Cooling fluid flows through the fluid flow path and cools the charging connector.

In some embodiments, a handle assembly for a charging connector of an electric vehicle is provided. The handle assembly includes a charging cable having a first end and a second end, such that first end of the charging cable is coupled to a power supply. The second end of the charging cable is coupled to a charging connector. The charging connector has a form factor that allows for the connecting of the charging connector to a charging inlet of electric vehicle. The charging connector has a first electrical socket and a second electrical socket. A first sleeve is concentrically coupled to first electrical socket and a second sleeve is concentrically coupled to second electrical socket. A manifold assembly encloses the first and second electrical sockets and the first and second sleeves, such that the first and second sleeves and manifold assembly create a hollow interior space there between. The manifold assembly has an inlet conduit and an outlet conduit defined within manifold assembly such that inlet conduit, interior space, and outlet conduit together create a fluid flow path. A handle housing encloses the charging connector and the charging cable such that charging cable extends outwards from one end of handle housing. Electrical sockets extend outwards from another end of handle housing. The handle housing defines a first opening to allow charging cable to extend outwards, and a second opening to allow the first and second electrical sockets to extend outwards of handle housing. Cooling fluid flows through fluid flow path for the cooling charging connector.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting it.

DETAILED DESCRIPTION

Figure 1:
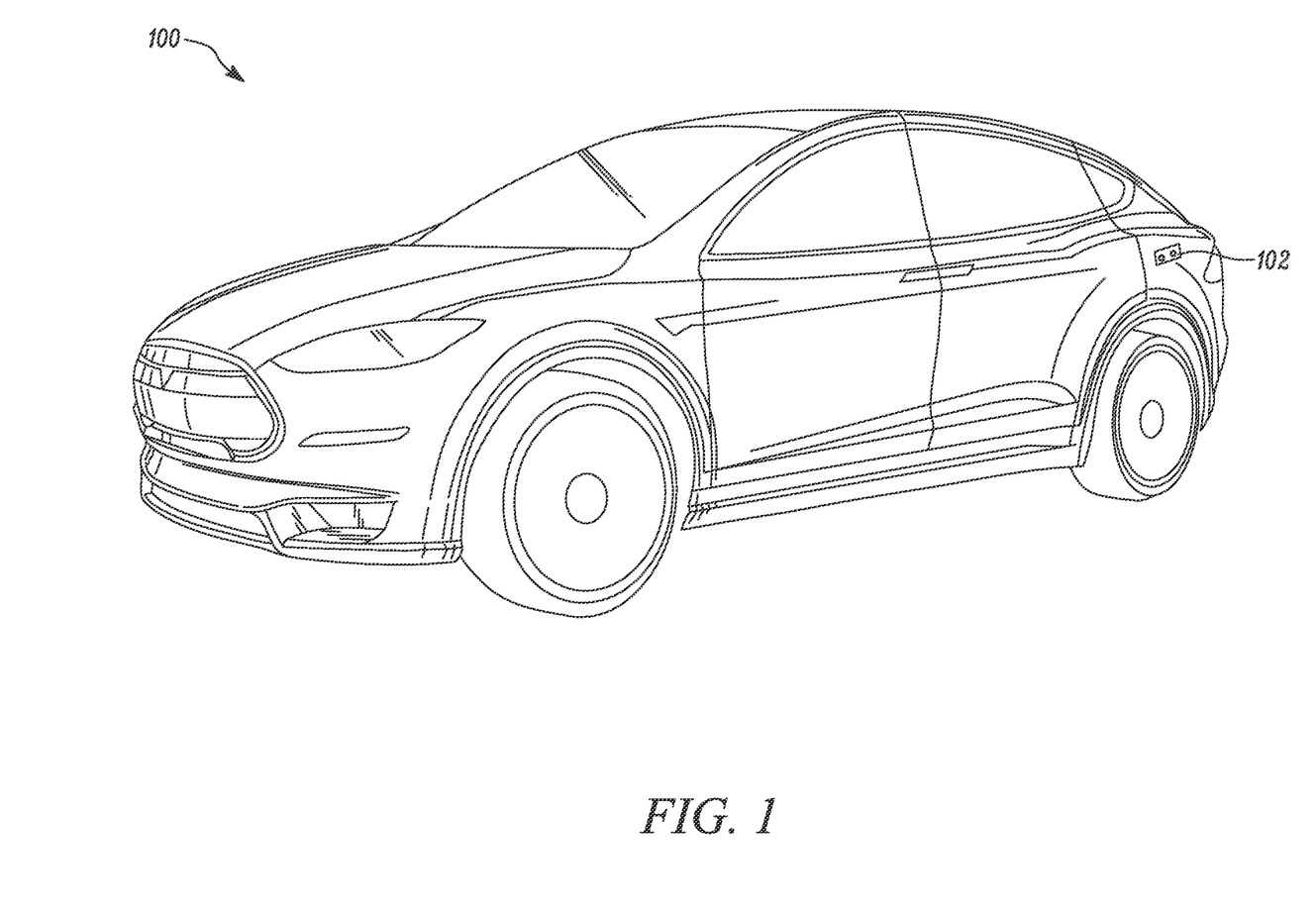
FIG. 1 illustrates an exemplary electric vehicle, according to certain embodiments of the disclosure.

FIG. 1 illustrates an exemplary vehicle 100. Vehicle 100 may be an electric vehicle or a hybrid vehicle. Vehicle 100 includes an electric powertrain (not shown) for propelling vehicle 100 over a ground surface. Vehicle 100 may include an energy storage device (not shown) for supplying energy to electric powertrain for propelling vehicle 100. Energy storage device may be a battery. Energy storage device may be any other energy storage means as well which may be suitable for application with various aspects of the present disclosure. Vehicle 100 includes a charging inlet 102 for charging the energy storage device. The charging inlet 102 may be internally connected to energy storage device such that electrical energy may be supplied through the charging inlet 102 to the energy storage device.

Figure 2:
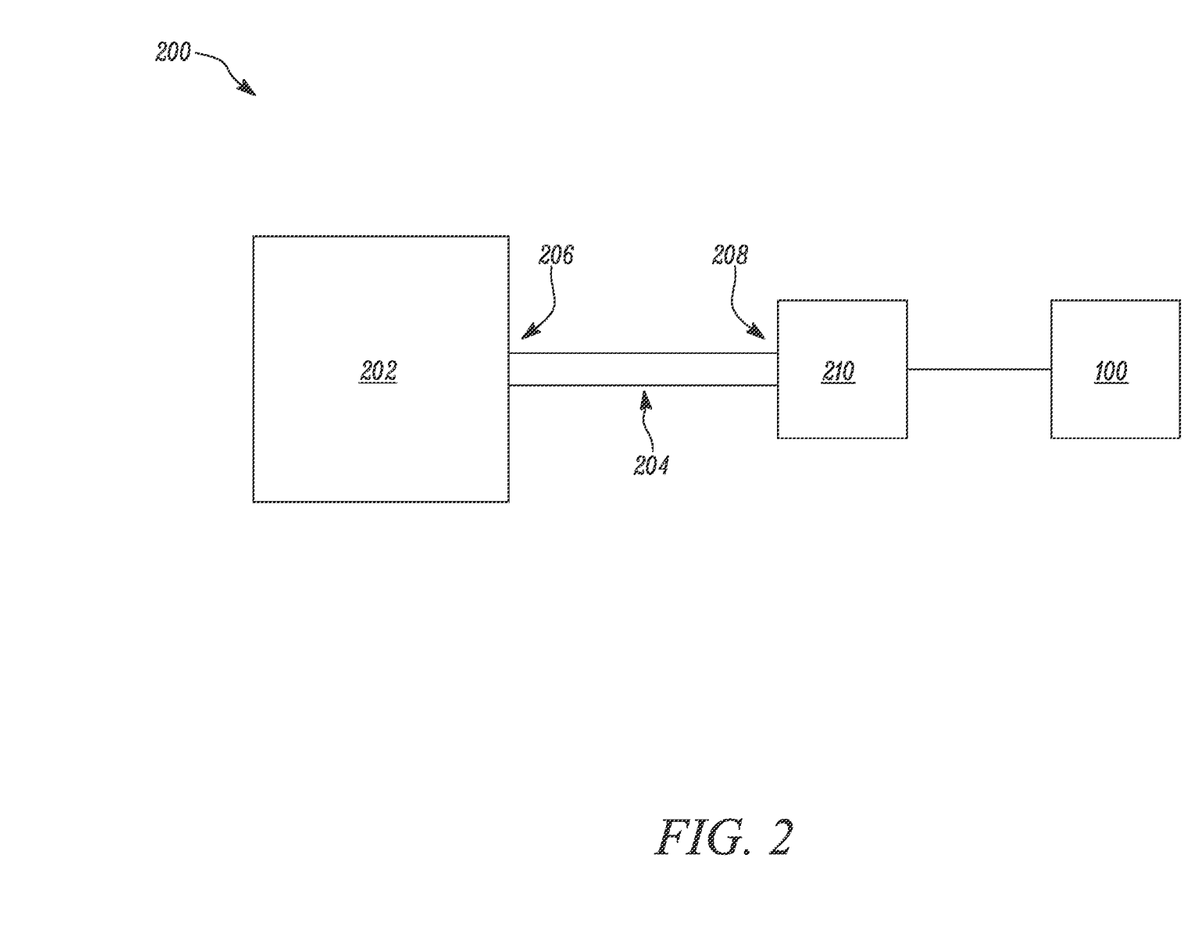
FIG. 2 schematically illustrates a charging system for the electric vehicle, according to certain embodiments of the disclosure.

FIG. 2 schematically illustrates a charging system 200 for charging vehicle 100. Charging system 200 includes a power supply 202. Power supply 202 may be an alternating current (AC) power supply available over electrical distribution networks. AC power supply may be converted to direct current (DC) power supply through appropriate conversion means. Alternatively, the power supply 202 may also be a DC power supply. The charging system 200 includes a charging cable 204 having a first end 206 and a second end 208. The first end 206 of charging cable 204 is coupled to power supply 202 and the second end 208 is coupled to charging connector 210. Charging connector 210 has a handle assembly 300 (shown in FIG. 3), which allows a user to hold charging connector 210 without allowing a user coming into contact with internal components of charging connector 210.

Figure 3:
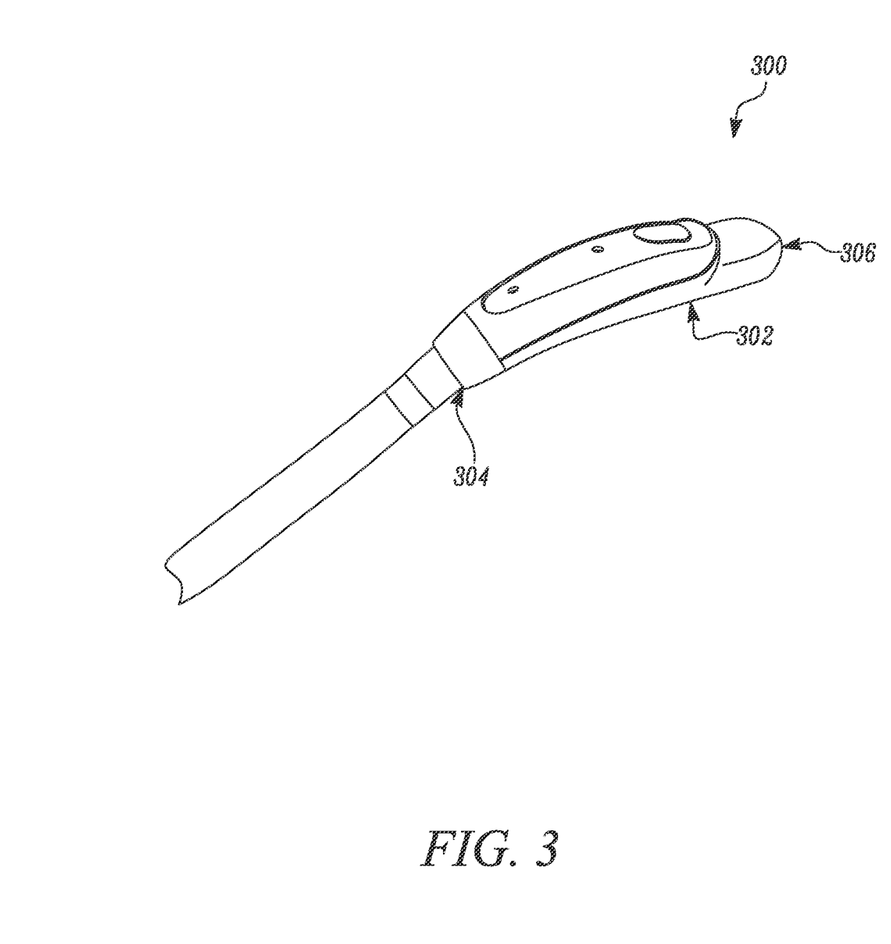
FIG. 3 illustrates a handle assembly for a charging connector, according to certain embodiments of the disclosure.

FIG. 3 shows the handle assembly 300 of charging connector 210. Handle assembly 300 includes a handle housing 302 which partially, or fully, encloses charging connector 210. Handle housing 302 also partially encloses charging cable 204. Handle housing 302 defines a first opening 304 through which charging cable 204 extends. Handle housing 302 further defines a second opening 306 through which internal components of charging connector 210 may extend outwards.

Figure 4:
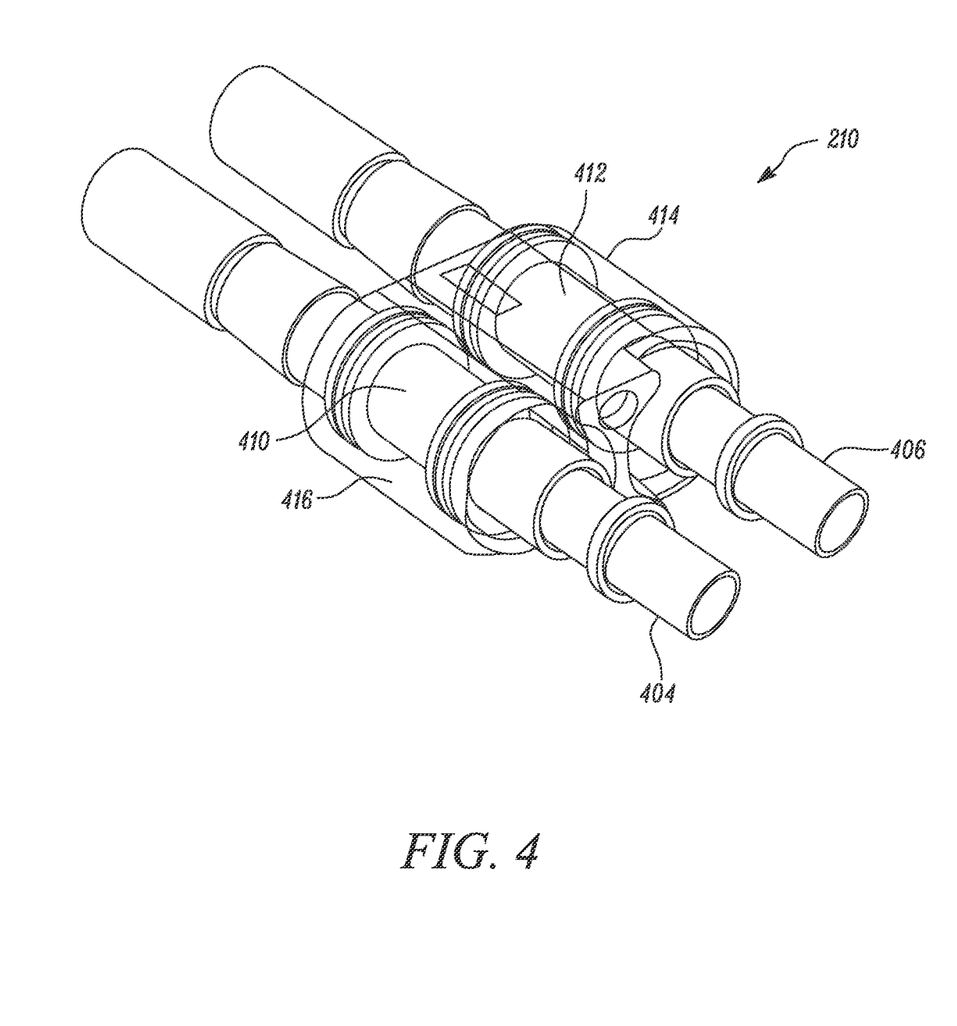
FIG. 4 illustrates the charging connector, according to certain embodiments of the disclosure.

FIG. 4 shows the charging connector 210 without handle housing 302. Charging connector 210 includes a first electrical socket 404 and a second electrical socket 406. A first sleeve 410 is concentrically coupled around the first electrical socket 404, and a second sleeve 412 is concentrically coupled around the second electrical socket 406. Charging connector 210 further includes a manifold assembly 414 which encloses the first and second electrical sockets 404, 406 and first and second sleeves 410, 412. The manifold assembly 414 and the first and second sleeves 410, 412 create a hollow interior space 416 between them.

Figure 5:
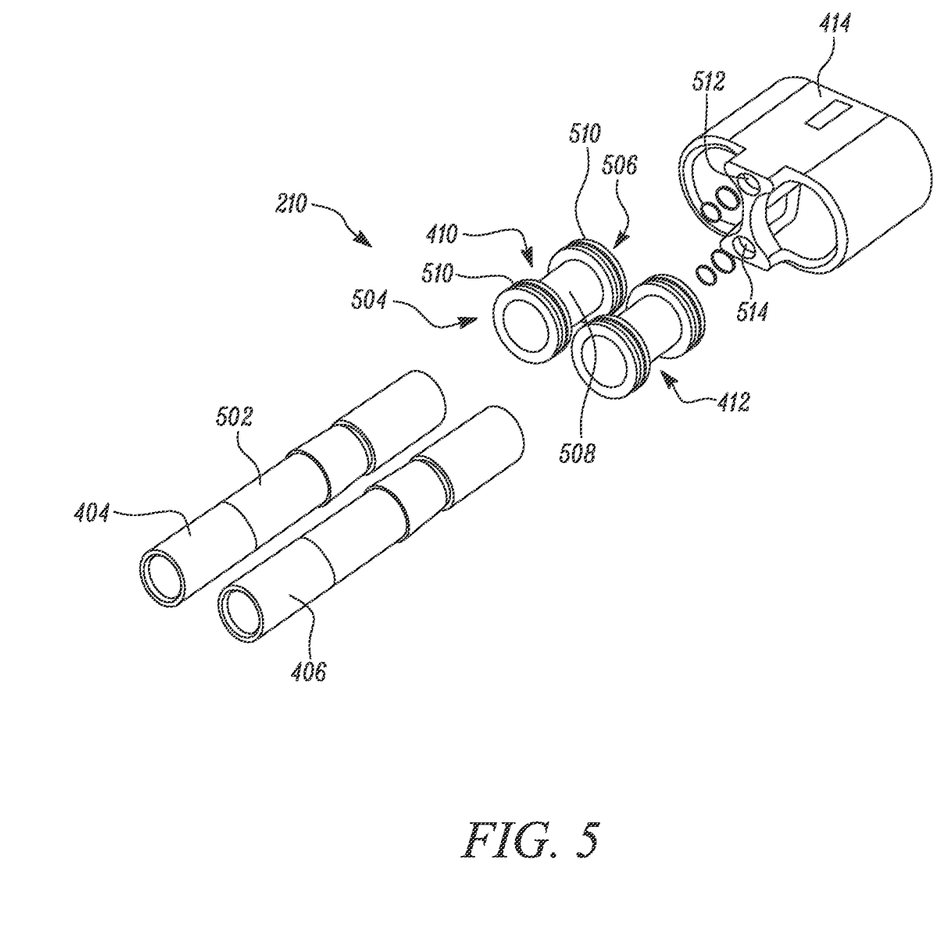
FIG. 5 illustrates an exploded view of the charging connector, according to certain embodiments of the disclosure.

FIG. 5 illustrates an exploded view of a charging connector 210. As shown, the charging connector 210 includes a first electrical socket 404 and a second electrical socket 406. The first electrical socket 404 has a generally hollow cylindrical structure. An outer surface 502 of first electrical socket 404 may be designed such that any other components, for example a sleeve, may be easily coupled to first electrical socket 404. In embodiments, the second electrical socket 406 has the same structure as that of first electrical socket 404. In other embodiments, the second electrical socket 406 has structural differences as compared to the first electrical socket 404.

Figure 6:
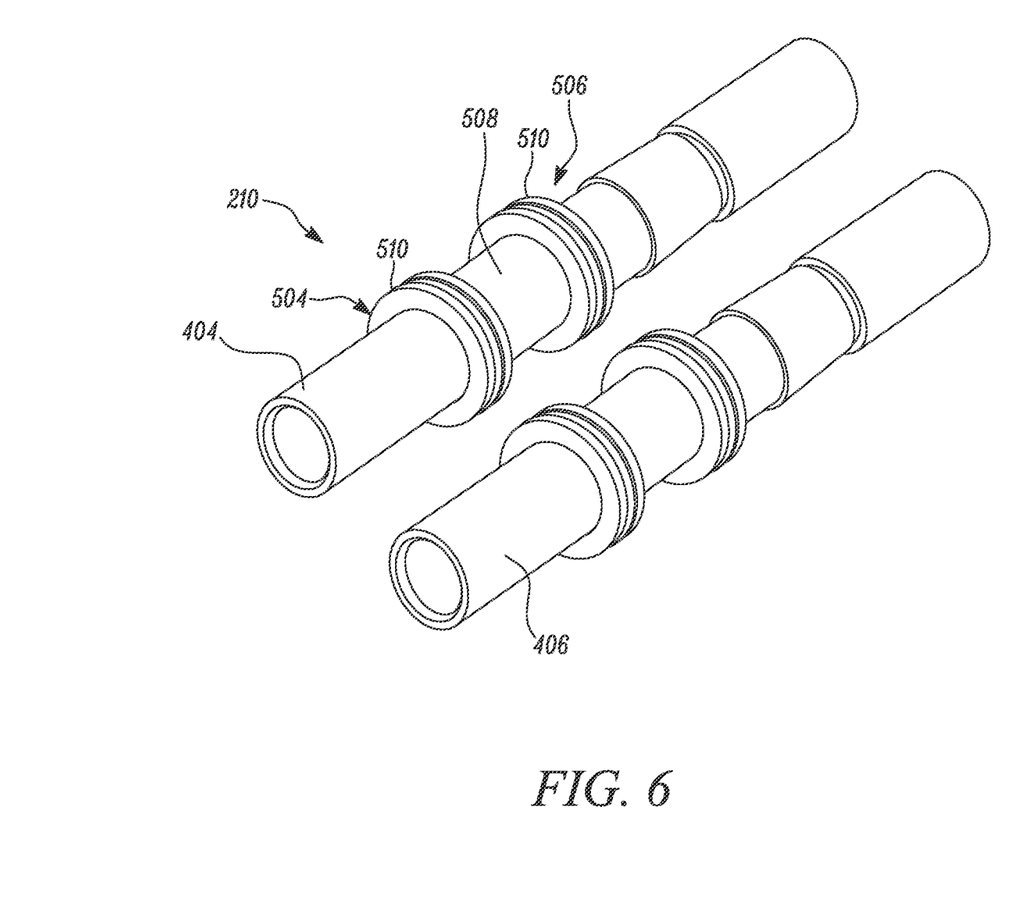
FIG. 6 illustrates the charging connector without a manifold assembly, according to certain embodiments of the disclosure.

Charging connector 210 includes the first sleeve 410 and second sleeve 412. The first sleeve 410 has a generally hollow cylindrical structure with a first end 504 and a second end 506. An outer surface 508 of first sleeve 410 includes raised profiles 510 towards first end 504 and second end 506, such that a groove is defined over outer surface 508 of first sleeve 410 extending from first end 504 to second end 506. Second sleeve 412 has exactly same structure as that of first sleeve 410. First and second sleeves 410, 412 are concentrically coupled to first and second electrical sockets 404, 406 as shown in FIG. 6. First sleeve 410 may be coupled to first electrical socket 404 by a press-fit assembly. The first sleeve 410 may also be coupled to the first electrical socket 404 through overmolding process. The first electrical socket 404 may be treated as a substrate material, and the first sleeve 410 may then be partially cover the first electrical socket 404. First sleeve 410 may also be coupled to first electrical socket 404 through any other mechanical joining means as well which may be suitable for application with various aspects of present disclosure.

Figure 7:
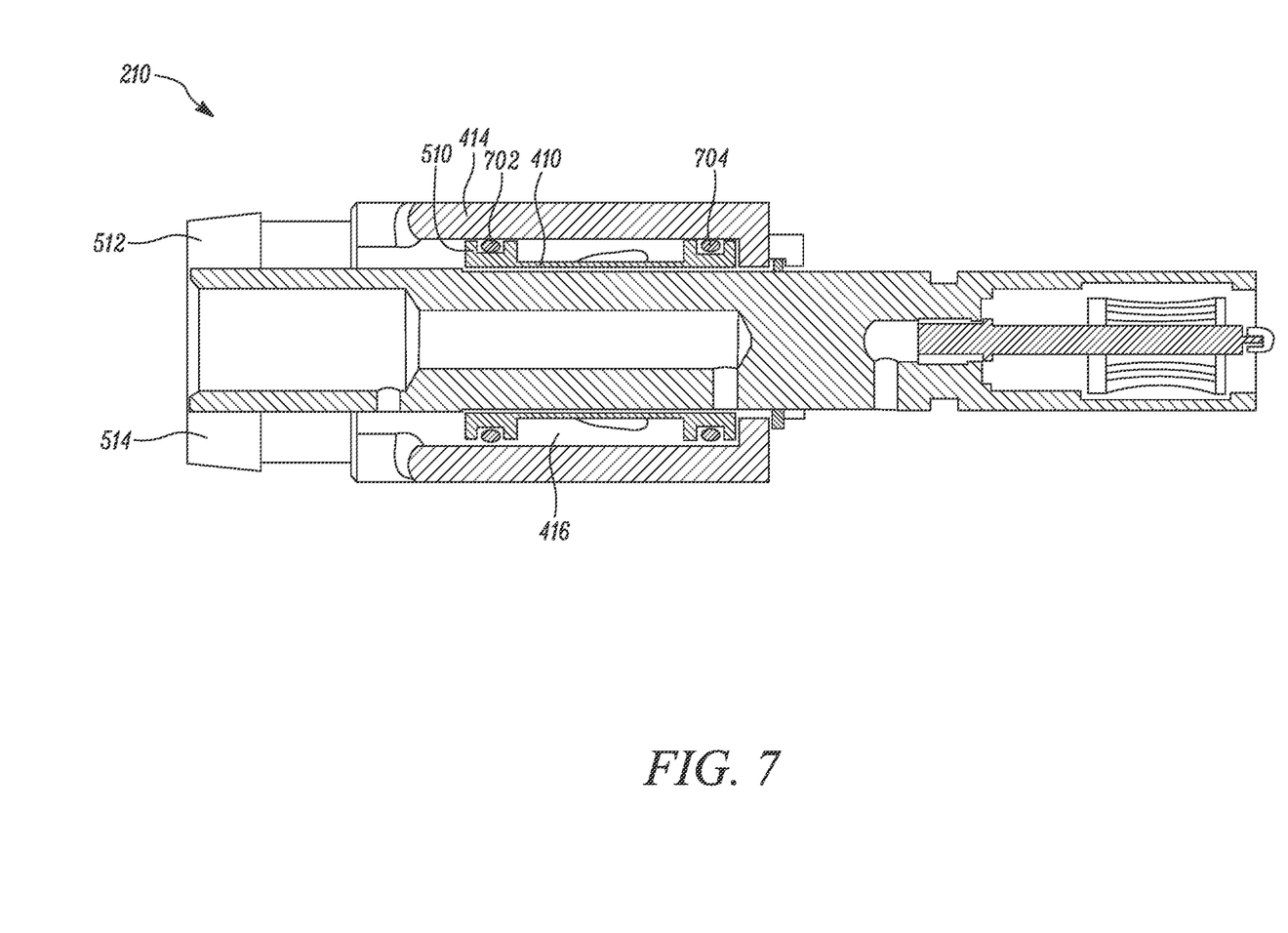
FIG. 7 illustrates a cross-sectional view of the charging connector, according to certain embodiments of the disclosure.

As shown in FIG. 5, charging connector 210 further includes manifold assembly 414. The manifold assembly 414 has a hollow structure to enclose various other components of charging connector 210. Manifold assembly 414 has an inlet conduit 512 and an outlet conduit 514. FIG. 7 shows a side cross-sectional view of charging connector 210 showing inlet conduit 512 and outlet conduit 514. One or more O-rings are provided between the first sleeve 410 and manifold assembly 414. As shown in FIG. 7, a first O-ring 702 is between the first sleeve 410 and the manifold assembly 414, and a second O-ring 704 is between the second sleeve 412 and the manifold assembly 414. More specifically, first O-ring 702 is between a raised profile 510 of the first sleeve 410 and the manifold assembly 414. Similarly, the second O-ring 704 is between the raised profile 510 of the first sleeve 410 and the manifold assembly 414.

The first and second O-rings 702, 704 provide an effective coupling between the first sleeve 410 and manifold assembly 414 such that no fluid escapes from the hollow interior space 416 or the fluid-flow path. Similarly, one or more O-rings (not visible) may be provided between second sleeve 412 and manifold assembly 414. The first sleeve 410 is concentrically coupled to the first electrical socket 404 such that the first sleeve 410 partially, or fully, encloses first electrical socket 404. Similarly, second sleeve 412 is concentrically coupled to the second electrical socket 406 such that the second sleeve 412 partially, or fully, encloses second electrical socket 406. First and second sleeves 410, 412 may be made of a thermally conducting plastic material such that heat generated by the electrical sockets 404, 406 is removed through sleeves 410, 412.

Figure 8:
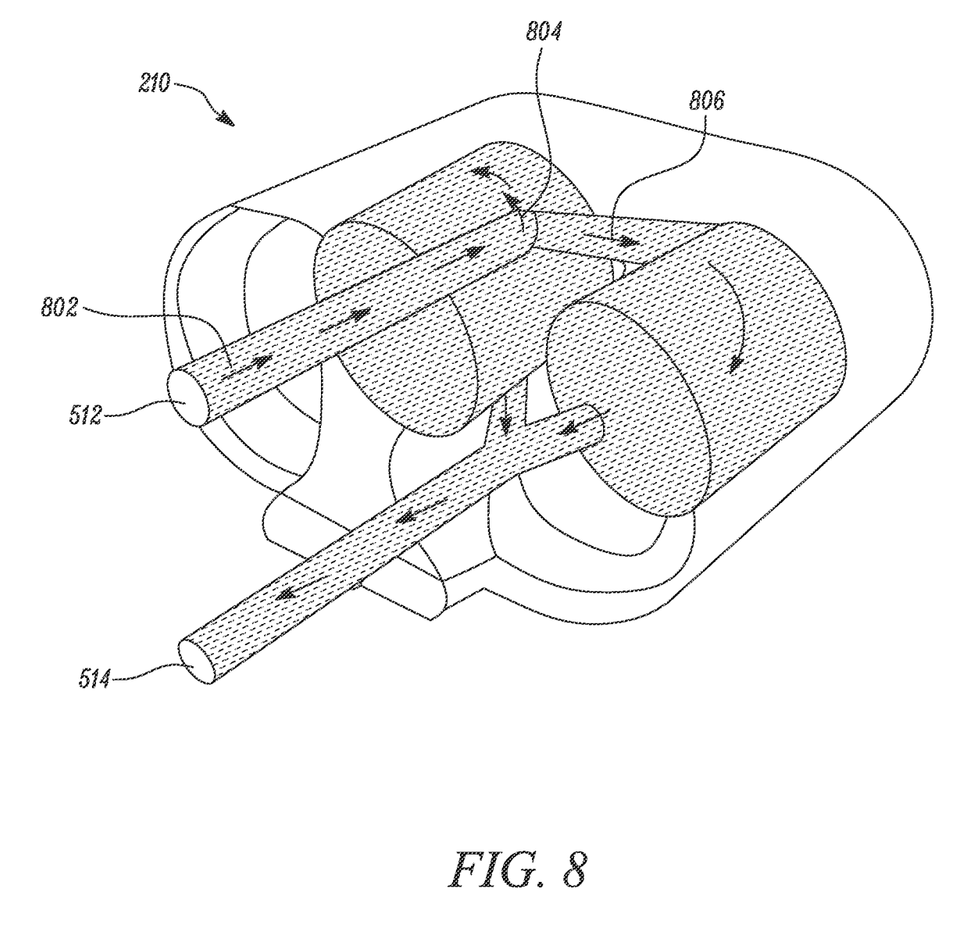
FIG. 8 schematically illustrates a fluid flow path in which cooling fluid flows around the charging connector, according to certain embodiments of the disclosure.

Inlet conduit 512 is connected to the hollow interior space 416 defined between manifold assembly 414 and first and second sleeves 410, 412. The outlet conduit 514 is also connected to the hollow interior space 416 between the manifold assembly 414 and the first and second sleeves 410, 412. The inlet conduit 512, hollow interior space 416, and outlet conduit 514 together create a fluid-flow path 802. FIG. 8 shows fluid flow path 802 within manifold assembly 414.

A cooling fluid may flow through fluid flow path 802 to transfer heat generated by the electrical sockets 404, 406 away from charging connector 210. Cooling fluid may enter manifold assembly 414 through inlet conduit 512. The cooling fluid then gets bifurcated into a first fluid stream 804 and a second fluid stream 806. The first fluid stream 804 flows around hollow interior space 416 (between the first sleeve 410 and the manifold assembly 414). Similarly, the second fluid stream 806 flows around the hollow interior space 416 (between second sleeve 412 and manifold assembly 414). In embodiments, the cooling fluid is ethylene glycol. In embodiments, the cooling fluid is an electrically conducting fluid.

Cooling fluid absorbs thermal energy from heat in the electrical sockets 404, 406. Sleeves 410, 412 are made of a thermally conducting, electrically insulating material. Heat from the electrical sockets 404, 406 is transferred to cooling fluid through sleeves 410, 412. After flowing around hollow interior space 416, the first fluid stream 804 and the second fluid stream 806 combine together upstream of outlet conduit 514 and flow outside of manifold assembly 414 through outlet conduit 514. Cooling fluid flowing out of manifold assembly 414 through outlet conduit 514 may be received by a reservoir (not shown) which may provide for heat exchanging arrangements. A heat exchanger may be provided to take away heat absorbed by cooling fluid. After rejecting absorbed heat, the cooling fluid may be recirculated back to inlet conduit 512 for further cooling of charging connector 210.

Figure 9:
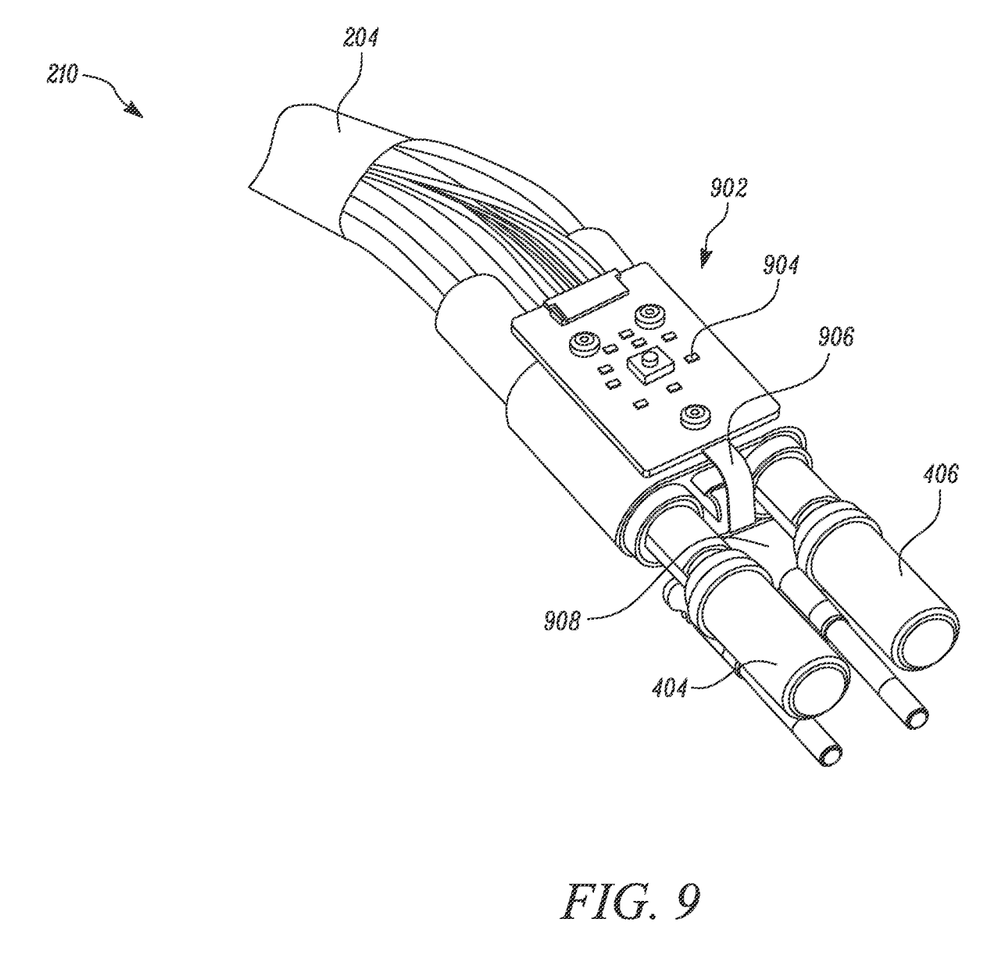
FIG. 9 illustrates another perspective view of the charging connector, according to certain embodiments of the disclosure.

FIG. 9 shows another component included by charging connector 210. A Printed Circuit Board Assembly (PCBA) 902 is thermally coupled to charging connector 210. In embodiments, PCBA 902 is a two-part structure. A first part of PCBA 904 is coupled to charging connector 210 such that the first part of PCBA 904 sits on top of electrical sockets 404, 406. A second part of PCBA 908 is connected to the first part of PCBA 904 through a rigid-flex PCB construction, or other similar interconnects. The two-part structure of PCBA 902 allows for a more efficient routing of electrical wires of charging connector 210, and overall size of charging connector 210 may be conveniently reduced.

Figure 10:
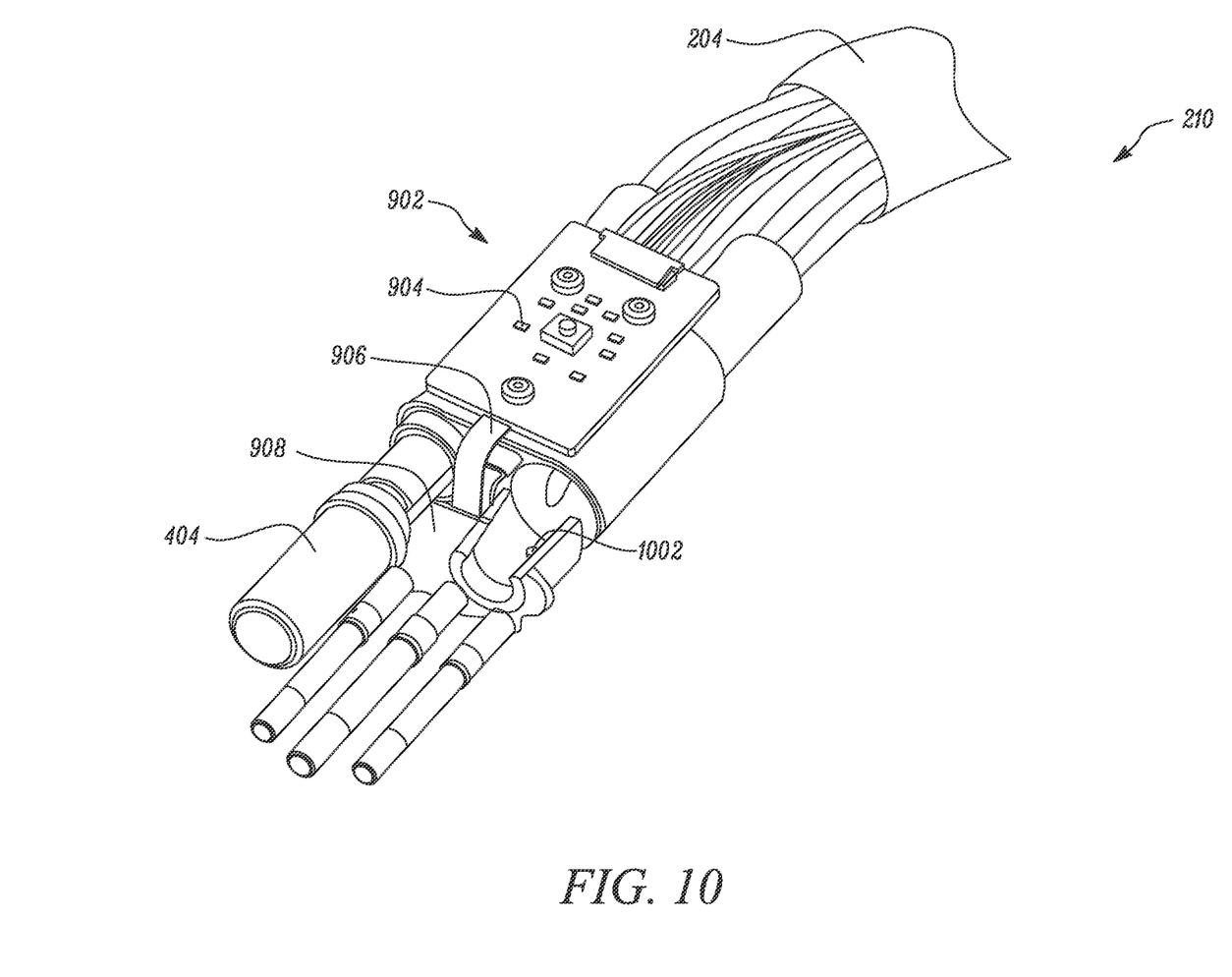
FIG. 10 illustrates another perspective view of the charging connector, according to certain embodiments of the disclosure.

FIG. 10 shows the charging connector 210 without electrical socket 406. Charging connector 210 includes a temperature sensor 1002. Temperature sensor 1002 is thermally coupled to electrical socket 406. Another temperature sensor (not shown) thermally coupled to the electrical socket 404 is provided under electrical socket 404. Thermal coupling of the temperature sensors provides a better sensing response for collecting temperature data through the temperature sensors.

The charging connector 210 disclosed in the present disclosure provides efficient cooling of pair of the electrical sockets 404, 406 through fluid flow path 802 partially within manifold assembly 414. Cooling fluid flows through fluid flow path 802, removing heat from the electrical sockets 404, 406. The cooling fluid can later reject the heat through any suitable heat exchange arrangement. Although various aspects of charging connector 210 are described with being used in an environment of charging of electric or hybrid vehicles, charging connector 210 may also be used in any other application area as well which may allow use of such a charging connector.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed air vent assembly. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

What is claimed is:

1. A charging connector comprising:
   a manifold assembly enclosing a plurality of connector portions coupled to respective sleeves, wherein the manifold assembly defines a hollow interior space therebetween; and
   an inlet conduit and an outlet conduit through which a cooling fluid flows for cooling the charging connector, wherein the manifold assembly is configured to cause the cooling fluid to flow in through the inlet conduit and bifurcate into two or more streams which flow around the sleeves and which subsequently combine together upstream to flow out of the outlet conduit.

2. The charging connector of claim 1, wherein the cooling fluid is recirculated back to the inlet conduit.

3. The charging connector of claim 1, wherein a first sleeve partially encloses a first electrical connector portion and a second sleeve partially encloses a second connector portion.

4. The charging connector of claim 1, wherein the sleeves comprise a thermally conducting plastic material.

5. The charging connector of claim 1, wherein the sleeves are coupled to corresponding connector portions by one or more of an overmolding process, or a press-fit assembly.

6. The charging connector of claim 1, wherein the charging connector is configured for connection to a two part Printed Circuit Board Assembly (PCBA).

7. The charging connector of claim 1, further comprising a pair of O-rings provided between a first sleeve and the manifold assembly.

8. The charging connector of claim 1, further comprising a temperature sensor coupled to at least one of the connector portions.

9. A charging system for an electric vehicle, the charging system comprising:
a power supply;
a charging cable having a first end and a second end, wherein the first end of the charging cable is coupled to the power supply;
a charging connector coupled to the charging cable at the second end, wherein the charging connector has a form factor corresponding to a charging inlet of the electric vehicle, the charging connector including:
a manifold assembly enclosing a plurality of connector portions coupled to respective sleeves, wherein the manifold assembly defines a hollow interior space there between; and
an inlet conduit and an outlet conduit through which a cooling fluid flows for cooling the charging connector,
wherein the manifold assembly is configured to cause the cooling fluid to flow in through the inlet conduit and bifurcate into two or more streams which flow around the sleeves and which subsequently combine together upstream to flow out of the outlet conduit.

10. The charging system of claim 9, wherein the cooling fluid is recirculated back to the inlet conduit.

11. The charging system of claim 9, wherein a first sleeve partially encloses a first electrical connector portion and a second sleeve partially encloses a second connector portion.

12. The charging system of claim 9, wherein the sleeves comprise a thermally conducting plastic material.

13. The charging system of claim 9, wherein the sleeves are coupled to corresponding connector portions by one or more of an overmolding process, or a press-fit assembly.

14. The charging system of claim 9, further comprising a two part Printed Circuit Board Assembly (PCBA) configured for connection to the charging connector.

15. The charging system of claim 14, wherein the two part PCBA includes a first part which is positioned on top of the connector portions.

16. The charging system of claim 15, wherein the two part PCBA includes a second part which is connected to the first part via a rigid-flex PCB construction.

17. The charging system of claim 9, wherein the charging connector further comprises a temperature sensor coupled to at least one of the connector portions.

18. A handle assembly for a charging connector of an electric vehicle, the handle assembly comprising:
a charging cable having a first end and a second end, wherein the first end of the charging cable is coupled to a power supply;
a charging connector coupled to the charging cable at the second end, wherein the charging connector has a form factor corresponding to a charging inlet of the electric vehicle, the charging connector including:
a manifold assembly enclosing a plurality of connector portions coupled to respective sleeves, wherein the manifold assembly defines a hollow interior space there between; and
an inlet conduit and an outlet conduit through which a cooling fluid flows for cooling the charging connector,
wherein the manifold assembly is configured to cause the cooling fluid to flow in through the inlet conduit and bifurcate into two or more streams which flow around the sleeves and which subsequently combine together upstream to flow out of the outlet conduit; and
a handle housing partially enclosing the charging connector, and at least partially enclosing the charging cable such that the charging cable extends outwards from one end of the handle housing, and first and second electrical connector portions of the plurality of connector portions extend outwards from another end of the handle housing.

19. The handle assembly of claim 18, wherein the cooling fluid is recirculated back to the inlet conduit.

20. The handle assembly of claim 18, wherein the charging connector further comprises a temperature sensor coupled to at least one of the connector portions.

* * * * *